UNITED STATES PATENT OFFICE.

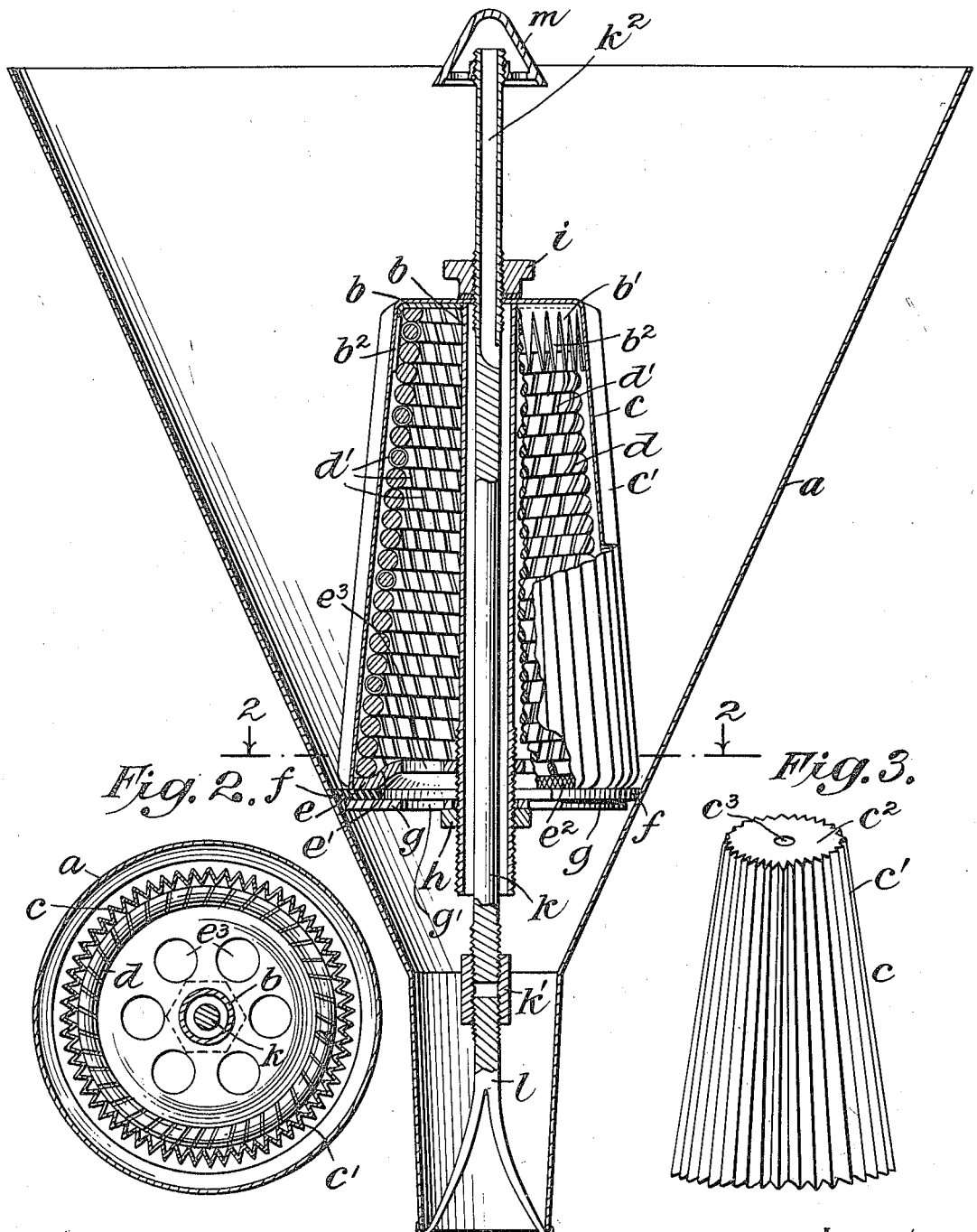

ALFRED P. WARMINGTON, OF NEW YORK, N. Y.

STRAINER FOR FUNNELS.

1,150,910.  Specification of Letters Patent. Patented Aug. 24, 1915.

Application filed March 13, 1914. Serial No. 824,347.

*To all whom it may concern:*

Be it known that I, ALFRED P. WARMINGTON, a citizen of the United States, and a resident of the borough of Manhattan of the city of New York, in the State of New York, have invented certain new and useful Improvements in Strainers for Funnels, of which the following is a specification, reference being had to the accompanying drawings, forming a part hereof.

This invention relates to strainers for funnels and has for its general objects to provide a strainer which shall be simple in construction, inexpensive to manufacture, efficient in operation and readily adjustable to funnels of varying sizes.

More specifically the invention seeks to improve the construction of strainers now known by providing an increased filtering surface for the liquid to be filtered and embodying filtering means which may be readily removed from the strainer and either cleaned or discarded, such filtering means being inexpensive.

In accordance with these and other objects which will appear hereinafter, the strainer is comprised generally of a body portion formed of a continuous coiled wire having grooves formed therein, adjustable devices for supporting said wire and determining the extent of opening between proximate coils thereof, and a filtering cap of paper or other suitable filtering material which may be slipped over the filtering coil and retained in place thereon by the adjustable devices referred to.

The invention will be described more particularly with reference to the accompanying drawings in which—

Figure 1 is a view partly in vertical section and partly in side elevation of a funnel provided with the improved strainer, the filtering cap and part of the filtering coil being shown in elevation and the cap being shown for the purposes of this description as supported loosely about the coil. Fig. 2 is a view partly in section taken on the plane indicated by the line 2—2 of Fig. 1. Fig. 3 is a view in perspective of the improved filtering cap.

As will appear as this description proceeds, the size and shape of the funnel to which the improved strainer is applied is immaterial, although the funnel $a$ herein illustrated is shown as bearing a suitable proportion in size and shape to the strainer. The strainer comprises a central tubular portion $b$ united with a circular cap $b'$ having ears $b^2$ struck up therefrom and extending in substantially conical relationship to the cap $b'$ to form an adequate support for the filtering cap $c$, which is provided throughout with fluted portions $c'$ whereby a maximum filtering area is attained. The ears $b^2$ on which rests a portion of the inner surface of the side wall of the cap $c$ extend into the fluted portions $c'$ of said cap and maintain the fluted portions in the desired relationship, that is, in such a position that a maximum area is presented to the liquid contained within the funnel $a$.

As illustrated in Fig. 3, the cap $c$, which may be of filtering paper or other suitable material, may be formed in the shape of a truncated cone, and is provided with a circular head portion $c^2$ adapted to rest on the metal cap $b'$ and in which is formed an aperture $c^3$ for a purpose which will later appear.

Within the annular row of teeth $b^2$ and abutting against the cap $b'$ is arranged a single helical coil of wire $d$ having its other end seated on a circular washer $e$, the upper face of which is curved suitably, as at $e'$, to constitute a seat for the said coil. The wire $d$ is grooved transversely throughout its length, as at $d'$, so as to leave a series of interstices between the proximate coils even when the latter are compressed tightly together. In order to effect such compression of the coils of the wire $d$, the washer $e$ is screw threaded on to the central tube $b$, so as to permit the effective distance between the cap $b'$ and the washer to be varied at will, and the relationship of the coils of the wire $d$ to be correspondingly altered.

To facilitate the rotation of the washer $e$ on the tube $b$, the outer periphery of the washer may be knurled, as at $e^2$.

In the filtering of coarse material, it may be unnecessary to have the proximate coils of the wire $d$ in abutment and in such case, the washer $e$ would be moved away from the cap $b'$ to permit the coils to spread with respect to each other. In case relatively fine material is to be filtered and the filtering cap $c$ is to be used, the washer $e$ would be moved toward the cap $b'$ and the edges of the wire compressed, either into absolutely snug engagement, in which case the filtrate would pass solely through the grooves $d'$, or nearly into snug engagement, in which case the interstices would be relatively small.

To prevent the discharge of liquid from the funnel without its passage through the filtering medium, a plastic washer $f$ is arranged below the washer $e$ in such a relation thereto and to the side of the funnel as to engage the latter and prevent the passage of liquid around its periphery. The lower edge of the cap $c$, while shown in Fig. 1 in loose engagement with the coil, is adapted, during use, to be placed between the washer $e$ and the plastic washer $f$, by simple manipulation of the nut $h$, as will hereinafter appear. The cap is retained in this position by engagement of the washer $e$ with the metal washer $g$. The plastic washer $f$, which is of a form corresponding to the cross sectional form of the funnel, is supported on a circular metallic washer $g$ through the center of which passes loosely the central tube $b$ and with the lower face of which engages an adjusting nut $h$, which is threaded on to the central tube. By means of the adjusting nut $h$ and the relation of the washer $g$ to the other washer $e$, the plastic washer $f$ may be compressed between the two and held fixedly in proper relationship to the strainer and the wall of the funnel $a$.

It will now appear that whereas the strainer might be applied readily to a funnel of a given size, its successful application to a funnel of different size would not be possible unless means were provided for changing the relationship of the parts of the strainer to the wall of the funnel. In accordance with the present invention, such means are provided in the form of an adjusting nut $i$ which abuts against the cap $b'$ and is supported adjustably on a threaded rod $k$ to the lower end of which is threaded adjustably a collar $k'$, with which collar is also in engagement a spring retaining clip $l$, the lower ends of which engage the throat of the funnel $a$ to retain the strainer in position in a manner which will be pointed out more particularly later. It will now appear that when the relationship of the strainer is to be changed with respect to the central rod $k$, as it should be, when the strainer is applied to funnels of varying sizes, the adjusting nuts $h$ and $i$ may be moved axially along the central tube $b$ and the rod $k$ respectively so as to move the filtering portions of the strainer bodily with respect to said rod $k$. Likewise, by means of the turn buckle arrangement found in the collar $k'$ and spring clip $l$, the lower ends of said spring clip may be changed with respect to the strainer and their engagement with the throat of the funnel insured regardless of the size or shape of the funnel to which the strainer is applied.

An additional feature of the improved strainer resides in the provision of means for venting the entrapped air from the strainer at the beginning of the filtering operation. Such a vent is formed within the upper end of the rod $k$, as at $k^2$, and communicates at its lower end with the interior of the central tube $b$ and at its upper end with the atmosphere, the upper end being disposed well above the normal level of the liquid to be filtered. In practice, it is desirable to provide said upper end with a removable cap or covering $m$ to guard against the accidental introduction of liquid into the vent $k^2$ during the filtering operation.

The structural features of the improved strainer having been set forth in detail, a brief description of the method of using the strainer will now be helpful for a clearer understanding of both its construction and its improved and advantageous features considered with respect to their respective functions. In assembling the parts of the strainer, it being remembered that the cap $b'$ is united permanently with the central tube $b$, the coiled wire $d$ is seated within the said cap and the washer $e$ is screwed on to the central tube $b$ until the lowermost coil of the wire $d$ is seated snugly in the curved portion $e'$ of the washer $e$. As explained before, the relationship of the proximate coils of the wire $d$ may be determined by the position of the washer $e$ on the central tube $b$. The filtering cap $c$ may then be placed in position on the cap $b'$, it being understood that at this time, both the protective cap $m$ at the upper end of the vent $k^2$ and the adjusting nut $i$ are removed from the rod $k$. At the time of the positioning of the filter paper $c$ the rod $k$ is passed through the aperture $c^3$ in the wall $c^2$ of the cap. As the paper is slid into position, the depending ears $b^2$ enter the fluted portion $c'$ of the cap and insure the proper position of such fluted portions and a maximum filtering surface. The nut $i$ many then be screwed on to the rod $k$ so as to secure the filtering paper $c$ in position and likewise determine the uppermost position of the cap $b'$ with respect to the tube $b$. The plastic washer $f$ may then be passed over the lower end of the rod $k$ and brought into position against the washer $e$ and locked there against movement by means of the other washer $g$. The adjusting nut $h$, bearing against the under face of the washer $g$ insures the placing of the plastic washer $f$ in proper position, determines the degree of compression of the coils of the wire $d$ and positions the entire strainer with respect to the rod $k$. After thus assembling the strainer, the spring clip $l$ is moved into engagement with the lower edge of the throat of the funnel $a$ and, if necessary, proper adjustment made by means of the turn buckle arrangement $k'$ until the engagement of the spring clip $l$ with the funnel serves to draw the periphery of the plastic washer *f* into liquid tight engagement with the wall of the funnel. Lastly, the cap *m* may be threaded on to the upper end of the rod *k* for the purpose specified.

In filtering, the liquid passes through the filtering paper *c* extending over every portion of the enlarged filtering surface secured by reason of the fluted portions of said paper, and then passes through the openings left by the grooves *d'* in the coils of the wire *d* or, if suitable adjustment has been made, directly between the proximate coils of said wire. Upon the first introduction of the liquid all entrapped air, both in the receiving vessel and the lower part of the funnel, is forced upward and out through the vent $k^2$. The filtrate, after passing through the coils in the manner noted, falls downward through suitable apertures $e^3$ and *g'* formed respectively in the washers *e* and *g* and through the throat of the funnel in a manner well known. The precipitate lodges on the fluted portions of the filtering cap *c* and, in case all of the precipitate is not caught by said cap, or in case the cap is not used and the coil of wire alone is relied on, then such remaining portion of the precipitate lodges on the outer face of the coiled wire *d*.

As will be understood, whenever desired, the filtering cap *c* may be readily removed and, being inexpensive, may be discarded and replaced by another filtering cap.

Details of construction employed in the improved strainer as well as rearrangements of the parts thereof will suggest themselves to those skilled in the art, but all such mere changes and rearrangements are to be deemed within the spirit of this invention provided that they fall within the scope of the appended claims.

I claim as my invention:

1. A strainer for funnels comprising a helical coil of wire provided with continuous grooves to form channels along the entire outer side of the coil to receive the filtrate and adjustable means embracing the ends of the coil to support the same and permit the coils of the wire to be compressed to any desired extent.

2. A strainer for funnels comprising a helical coil of wire provided with continuous grooves to form channels along the entire inner and outer surfaces of the coil to receive the filtrate, and adjustable means embracing the ends of the coil to support the same and permit the coils of wire to be compressed to any desired extent, said means including a circular cap, a tubular member united therewith and extending axially of the helical coil and a washer threaded on to said tubular member and on which the coil seats.

3. A strainer for funnels comprising a helical coil of wire provided with grooves to permit the passage of the filtrate, and adjustable means embracing the ends of the coil to support the same and permit the coils of the wire to be compressed to any desired extent, said means including a circular cap, a tubular member united therewith and extending axially of the helical coil, a washer threaded on to said tubular member and on which the coil seats, a second washer below the first named washer through which the tubular member passes, a plastic washer interposed between said first named washers and adapted to engage the wall of the funnel to prevent the escape of the liquid to be filtered and removable means coöperating with the tubular member to maintain all three of said washers in snug engagement.

4. A strainer for funnels comprising a helical coil of wire provided with grooves to permit the passage of the filtrate, adjustable means embracing the ends of the coil to support the same and permit the coils to be compressed to any desired extent, and means to retain the strainer in position in the funnel, said means including a rod disposed within the coil and having at its lower end a spring clip to engage the throat of the funnel and a nut threaded on to said rod and coöperating with the wire to hold the strainer against axial movement in one direction with respect to the rod.

5. A strainer for funnels comprising a helical coil of wire provided with grooves to permit the passage of the filtrate, adjustable means embracing the ends of the coil to support the same and permit the coils to be compressed to any desired extent, and means to retain the strainer in position in the funnel, said means including a rod disposed within the coil and having at its lower end a spring clip in adjustable engagement with the rod to engage the throat of the funnel and a nut threaded on to said rod and coöperating with the wire to hold the strainer against axial movement in one direction with respect to the rod, said rod being bored interiorly to form an air vent communicating at one end with the interior of the strainer and at the other end with the atmosphere to permit the venting of entrapped air.

This specification signed and witnessed this 10th day of March, A. D. 1914.

ALFRED P. WARMINGTON.

Signed in the presence of—
ELLA J. KRUGER,
WORTHINGTON CAMPBELL.